United States Patent
Beck et al.

(10) Patent No.: US 11,784,543 B2
(45) Date of Patent: Oct. 10, 2023

(54) ELECTRIC MACHINE AND MOTOR VEHICLE

(71) Applicant: Bayerische Motoren Werke Aktiengesellschaft, Munich (DE)

(72) Inventors: Florian Beck, Freising (DE); Philip Moerth, Munich (DE); Philipp Petz, Munich (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 0 days.

(21) Appl. No.: 17/786,892

(22) PCT Filed: Dec. 15, 2020

(86) PCT No.: PCT/EP2020/086081
§ 371 (c)(1),
(2) Date: Jun. 17, 2022

(87) PCT Pub. No.: WO2021/155983
PCT Pub. Date: Aug. 12, 2021

(65) Prior Publication Data
US 2023/0043493 A1   Feb. 9, 2023

(30) Foreign Application Priority Data

Feb. 5, 2020   (DE) ............... 10 2020 102 891.1

(51) Int. Cl.
*H02K 13/00*   (2006.01)
*H01R 39/08*   (2006.01)
(Continued)

(52) U.S. Cl.
CPC ........... *H02K 13/003* (2013.01); *H01R 39/08* (2013.01); *H01R 39/14* (2013.01); *H02K 13/02* (2013.01)

(58) Field of Classification Search
CPC ...... H02K 13/003; H02K 13/02; H01R 39/08; H01R 39/14
See application file for complete search history.

(56) References Cited

U.S. PATENT DOCUMENTS 6,236,128 B1 *   5/2001   Dragash, Jr. ........... H02K 13/02
                                                  310/85
2006/0273685 A1   12/2006   Wada et al.
(Continued)

FOREIGN PATENT DOCUMENTS

AU   2019100735 A4 *   8/2019
AU   2019100735 A4      8/2019
(Continued)

OTHER PUBLICATIONS

WO-2019138905-A1_translate (Year: 2019).*
(Continued)

*Primary Examiner* — Tulsidas C Patel
*Assistant Examiner* — Mohammed Ahmed Qureshi
(74) *Attorney, Agent, or Firm* — Crowell & Moring LLP

(57) ABSTRACT

An electric machine has a stator, a rotor, and a slip ring module which is connected to a motor shaft of the electric machine. The slip ring module is equipped with at least one wire guiding channel, through which a respective contact wire is guided in order to electrically connect a rotor winding to a slip ring. A first section of the wire guiding channel runs from the slip ring in the axial direction parallel to the motor shaft. A second section of the wire guiding channel runs adjacently thereto radially outwards. An elastic seal element which surrounds the respective contact wire is arranged in or on the second section in order to seal the wire guiding channel to prevent a lubricant from entering the channel.

9 Claims, 2 Drawing Sheets

(51) Int. Cl.
*H01R 39/14* (2006.01)
*H02K 13/02* (2006.01)

(56) References Cited

U.S. PATENT DOCUMENTS

| | | | |
|---|---|---|---|
| 2015/0035393 A1 | 2/2015 | Rippel et al. | |
| 2015/0288120 A1 | 10/2015 | Yumoto et al. | |
| 2019/0217322 A1 | 7/2019 | Kelders et al. | |

FOREIGN PATENT DOCUMENTS

| | | | | |
|---|---|---|---|---|
| DE | 43 14 628 C1 | 6/1994 | | |
| DE | 10 2006 025 394 A1 | 1/2007 | | |
| DE | 11 2013 003 975 T5 | 7/2015 | | |
| DE | 102017004248 A1 | * 11/2018 | | |
| EP | 2 747 255 A1 | 6/2014 | | |
| EP | 3 261 231 A1 | 12/2017 | | |
| JP | 56-139375 U | 10/1981 | | |
| JP | S56139375 U | * 10/1981 | ............ | H02K 12/02 |
| WO | WO 2018/011740 A1 | 1/2018 | | |
| WO | WO 2019/138905 A1 | 7/2019 | | |
| WO | WO-2019138905 A1 | * 7/2019 | ............ | H01R 39/00 |

OTHER PUBLICATIONS

DE-102017004248-A1_translate (Year: 2018).*
JPS56139375U_translate (Year: 1981).*
International Search Report (PCT/ISA/210) issued in PCT Application No. PCT/EP2020/086081 dated Mar. 23, 2021 with English translation (six (6) pages).
German-language Written Opinion (PCT/ISA/237) issued in PCT Application No. PCT/EP2020/086081 dated Mar. 23, 2021 (six (6) pages).
German-language Office Action issued in German Application No. 10 2020 102 891.1 dated Jul. 2, 2020 (five (5) pages).

* cited by examiner

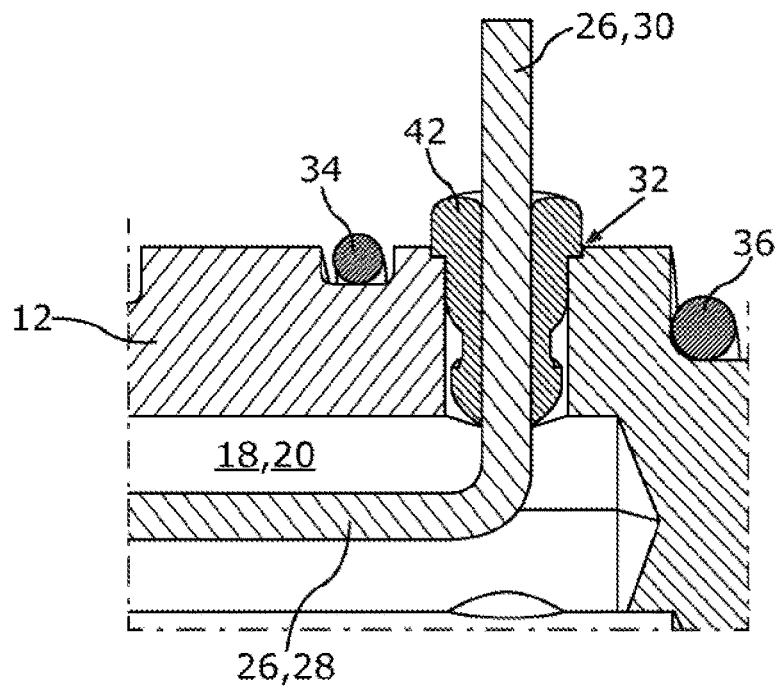
Fig. 3
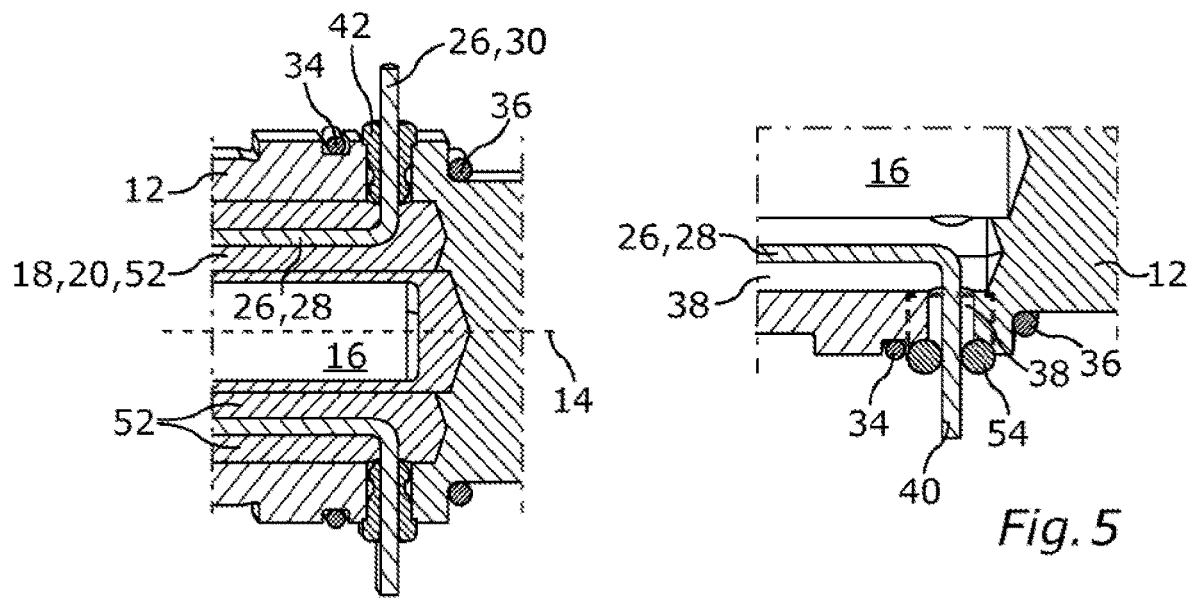
Fig. 4
Fig. 5

ELECTRIC MACHINE AND MOTOR VEHICLE

BACKGROUND AND SUMMARY OF THE INVENTION

The present invention relates to an electric machine, in particular for a motor vehicle, and to a motor vehicle having such an electric machine.

Diverse variants of electric machines have long been known, but are still of particular importance in many technical and industrial application areas. It is foreseeable that, in future, the importance of electric machines specifically in the sector of automotive engineering will increase further. Against this background, further improvements and optimizations are very clearly desirable.

Electric machines can often be operated as electric motors or as generators. For example, an alternating current generator to be installed in a vehicle is known from DE 10 2006 025 394 A1. In this case, slip rings which are rotatable by a rotary shaft and brushes which split thereon and are accommodated in a brush holder are provided. The slip rings and the brush holder are covered by a slip ring covering. A rear cover which covers the brushes has a first ventilation opening which forms a connection between an interior space containing the slip sections of the brushes and an exterior of the alternating current generator. Furthermore, a second ventilation opening is provided which forms a connection between an interior space containing the brushes within the brush holder and the exterior of the alternating current generator. The interior space containing the slip sections of the brushes is sealed here by sealing parts. These sealing parts can be arranged approximately at axial ends of the brush holder and of the slip ring covering and are composed of a plate-like rubber material.

As a further use example, an electric rotating and pivoting unit having a directly driven, brushless motor, for example for industrial robots, is known from DE 43 14 628 C1. A stator here serves as the basic housing with stepless pivoting angle adjustment, integrated air feed-through and an integrated electrical signal and energy feed-through with plug-in connectors. There are no outer hoses and cables. The entire unit is dust proof and splash proof, with at the same time a modular design and simple exchangeability of a rotary plate being provided. A plurality of channels run through a distribution flange and are each used to connect a connection channel in the rotary divider. Seals can be arranged on both sides of a respective connection between a channel and a connection channel.

In a further use example, a liquid-cooled electric motor is known from DE 11 2013 003 975 T5. A coolant distribution system is provided here in order to distribute a liquid coolant between a first path and a second path. The first path leads into a hollow rotor shaft from where the coolant can flow radially outward through shaft radial holes in the hollow rotor shaft during operation and then can flow further longitudinally in a rotor coolant passage in the rotor into a collecting container. The second path leads radially outward through inlet radial holes in a coolant inlet connection during operation and then longitudinally in a peripheral coolant passage which is arranged in a gap between a housing and a stator of the electric motor, and finally likewise into the collecting container. No liquid-tight seals have to be provided here for a plurality of internal flow paths, which can save on costs. The single liquid-tight seals which are required are those which are connected between the coolant and the outer surroundings.

It is an object of the present invention to improve the reliability of an electric machine, in particular in a wet-running mode. This object is achieved according to the claimed invention.

The electric machine according to an embodiment of the invention has a stator and a rotor which is mounted therein so as to be rotatably movable about a center longitudinal axis of a motor shaft of the electric machine, and a slip ring module which is connected, i.e. coupled, to the motor shaft. The slip ring module is rotationally fixed with respect to the rotor and rotatable relative to a slip ring of the electric machine and has at least one wire guiding channel through which a respective contact wire is guided for electrically connecting a respective rotor winding to the slip ring. The at least one wire guiding channel reaches here at least substantially from the slip ring as far as a wire outlet of the slip ring module. A first section of the wire guiding channel runs here in the axial direction parallel to the center longitudinal axis starting at least substantially or virtually from the slip ring. A second section of the wire guiding channel adjoining the first section runs radially outward as far as the wire outlet. The wire outlet here is therefore a radially outer end of the second section of the wire guiding channel, i.e. ultimately an opening in a side wall or outer wall of the slip ring module. The wire outlet can also comprise a region of the slip ring module that directly surrounds this opening.

According to an embodiment of the invention, an elastic sealing element surrounding the contact wire, which is guided in the wire guiding channel, for sealing the wire guiding channel against penetration of a lubricant into the wire guiding channel at the wire outlet is arranged in or on the second section of the wire guiding channel. In other words, the sealing element therefore seals the wire guiding channel, in particular the second section of the wire guiding channel, or the wire outlet, from a surrounding region of the slip ring module or of the electric machine. As will also be explained in more detail further below, the sealing element can be designed, for example, as a sealing plug which is inserted into the second section of the wire guiding channel, but also, for example, as an O ring. Such an O ring can lie, for example, on the wire outlet, i.e. at the radially outer end of the second section of the wire guiding channel, or can be inserted into a radially outer end region of the second section of the wire guiding channel.

The electric machine according to an embodiment of the invention can preferably be a wet-running synchronous machine, i.e. a synchronous machine running with oil at least in regions, for example a current-excited synchronous machine. In this case, in a basically known way, the motor shaft can be connected in a rotationally fixed manner with respect to the rotor or can be carried along by the latter during operation of the electric machine. The slip ring here is part of a slip contact, i.e. constitutes an electrical connection between a part of the electric machine which is stationary during operation and a part of same which rotates during operation.

Advantageously, by way of the sealing element arranged in or on the wire guiding channel, an embodiment of the present invention can prevent in particular the oil serving as lubricant from passing onto the slip contact, i.e. onto the slip ring. It is in principle known from known electric machines to provide outer-side seals, for example, on both sides of the slip ring, for example in the form of sealing rings surrounding the motor shaft or the slip ring module. However, the present invention is based on the finding that the lubricant can pass, for example, through cracks in a rotor filling material to the wire guiding channel or to the wire outlet.

From there, the lubricant can then creep—in particular because of the capillary effect—along the contact wire through the wire guiding channel and can thus pass as far as the slip contact or as far as the slip ring. In the process, it can infiltrate the previously provided seals. If the lubricant passes to the slip contact, it can cause a deterioration there, for example, in the electric contact, can entirely or partially interrupt an electric flow, and can lead to damage or additional wear and thus ultimately can reduce the reliability and the service life of the electric machine. By way of the sealing element provided here in or on the second section of the wire guiding channel, this oil path that has hitherto not been taken into consideration can be closed or sealed, as a result of which the disadvantageous effects which are mentioned can be avoided or reduced.

The electric machine can have a plurality of wire guiding channels which are distributed in the circumferential direction and the second sections of which can each be closed or sealed with a dedicated sealing element. By way of different wire guiding channels or the various contact wires running therein, various windings of the rotor, i.e. various poles or pairs of poles of the rotor, can be contacted and supplied with electrical current in order to generate a rotor field. For the sake of simplicity and clarity, the present invention here is however explained essentially for a wire guiding channel and accordingly for a sealing element.

In an advantageous refinement of the present invention, the wire guiding channel is mostly filled with a thermoset molding compound surrounding the contact wire. The respective contact wire is therefore electrically insulated and mechanically fixed by the molding compound. The molding compound can be, for example, injected or cast into the wire guiding channel while the contact wire is arranged or is held in the wire guiding channel. Similarly, by surrounding the contact wire, the molding compound can first form the wire guiding channel. In order to manufacture the electric machine, for example, first of all the contact wire can be introduced into the respective wire guiding channel in the axial direction and then offset outward in the radial direction such that a bent-over, radially outwardly projecting end of the contact wire passes through the second section of the wire guiding channel. The contact wire can then be held or clamped in this position. The sealing element can already be located here on the bent-over end of the contact wire or can be pushed onto the contact wire only after the latter has been introduced or positioned. After both the contact wire and the sealing element have been positioned, the molding compound can then be injected or cast. As soon as the molding compound has then solidified or hardened, the wire guiding channel is then formed or filled and the contact wire fixed by way of the molding compound. As will also be explained in more detail further below, the sealing element can advantageously also be held or fixed by the molding compound. Although the contact wire is in this way directly embedded in the molding compound, a distance can nevertheless be provided between the contact wire and the molding compound, for example due to air inclusions, surface roughness and/or other similar features. Such a distance may be, for example, a few micrometers, which may be sufficient as a creepage distance for the lubricant to spread along the contact wire. It is therefore particularly advantageous for the sealing element to prevent the penetration of the lubricant. Owing to the elasticity of the sealing element, the latter can additionally lie, for example, more tightly on the contact wire than the thermoset molding compound typically does.

In a further advantageous refinement of the invention, the sealing element is manufactured from an elastomer, in particular from an ethylene acrylate elastomer (AEM), having a dielectric strength of at least 15 kV/mm. The sealing element is therefore manufactured here from a material which is simultaneously elastic and has a relatively high electric insulation class and a relatively high creepage current resistance or a relatively high comparative tracking index (CTI). The advantageous effect firstly achieved is the desired sealing of the second section of the wire guiding channel or of the wire outlet and secondly an improvement in the electric insulation of the contact wire and/or an improvement in the susceptibility to creepage current and flashover of the electric machine. For example, by way of the sealing element, a creepage current distance between a part of the contact wire projecting radially outward from the wire outlet and an outer side or surface of the slip ring module surrounding the wire outlet can be increased.

In a further advantageous refinement of the present invention, the sealing element is designed as a sealing plug which is arranged in the second section of the wire guiding channel. The sealing plug can pass or reach here through the second section of the wire guiding channel partially, preferably, however, completely in the radial direction, i.e. perpendicularly to the center longitudinal axis to the motor shaft. By way of the configuration of the sealing element as such a sealing plug introduced into the wire guiding channel and having a significant radial extension, a particularly good sealing effect and a particularly reliable fit or support of the sealing plug in its designated position, i.e. in the second section of the wire guiding channel, can advantageously be achieved. The sealing plug can be inserted here into the second section of the wire guiding channel either from the inner side in a radially outwardly pointing direction or from the outside in a radially inwardly pointing direction. The former can advantageously permit a particularly reliable support or fit of the sealing plug in the second section of the wire guiding channel under the action of centrifugal forces, as occur during operation of the electric machine, while the latter can advantageously permit particularly simple manufacturing of the electric machine.

In an advantageous development of the present invention, the sealing plug projects radially outward beyond an end, formed by the wire outlet, of the second section of the wire guiding channel. In other words, the sealing plug therefore protrudes on the outer side over an outer wall or surface of the slip ring module in the region of the wire outlet. As a result, the electric insulation effect of the sealing plug can advantageously be improved further since a creepage current distance or flashover distance between that part of the contact wire which protrudes radially outward from the sealing plug and the surrounding surface of the slip ring module can be increased further. In addition, the sealing plug can thus advantageously lie on the contact wire over a relatively long distance, thus enabling an improved or particularly reliable sealing effect. Furthermore, this configuration advantageously affords the possibility of widening in the axial direction a region of the sealing plug protruding radially outward over the wire outlet, as a result of which, firstly, the insulation effect of the sealing plug and, secondly, a positioning accuracy or positioning reliability and/or the fit or support of the sealing plug in its designated position can be improved.

In an advantageous development of the present invention, it is provided that the sealing plug has an at least substantially mushroom-shaped form with a shaft region and a head region which is widened in comparison thereto. A largest diameter of the head region is larger here than a smallest diameter of the second section of the wire guiding channel or than a diameter of the wire outlet. In other words, the sealing plug is therefore shaped in such a manner that it can be partially—namely with the shaft region—inserted into the wire guiding channel, while the head region is too wide or too large for this purpose. Therefore, as described, the electric insulation effect of the sealing plug can optionally be improved further. It can also be prevented, for example, that, during the manufacture of the electric machine, the sealing plug is pushed through the second section of the wire guiding channel or too far into the second section of the wire guiding channel. On the contrary, it can be provided that the widened head region lies on a surface which surrounds an end of the second section of the wire guiding channel or the wire outlet. This can be advantageously realized particularly simply and particularly reliably during the manufacturing of the electric machine. Depending on the configuration, the head region can be arranged radially on the inside or outside. Depending on the elasticity of the sealing plug, a diameter of the shaft region can correspond at least in sections or regions for example to the diameter of the second section of the wire guiding channel or can be so much larger than the diameter of the second section of the wire guiding channel that the shaft region, because of its elasticity, i.e. its elastic deformability or compressibility, can nevertheless be inserted into the second section of the wire guiding channel. The latter can advantageously bring about a particularly good sealing effect of the sealing plug.

In an advantageous development of the present invention, the sealing plug is fixed or held in the second section of the wire guiding channel by a molding compound which encases and fixes the contact wire at least in the first section of the wire guiding channel. This can be in particular the thermoset molding compound which has been mentioned. By way of the fixing proposed here of the sealing plug by the molding compound, it can advantageously be prevented in a particularly simple and cost-effective manner that the sealing plug, for example because of centrifugal forces occurring during operation of the electric machine, is pushed or pulled out of the second section of the wire guiding channel. Particularly advantageously, no additional fastening elements are necessary here for fixing the sealing plug, which can advantageously reduce the complexity and an outlay on production and costs of the electric machine. In order to fix the sealing plug, the molding compound, for example, can partially surround the sealing plug. The molding compound can hold or fix the sealing plug for example in a form-fitting, integrally bonded and/or force-fitting manner, for example depending on the configuration of the sealing plug and/or depending on the selection of material or combination of materials.

In an advantageous development of the present invention, the sealing plug has a constriction with a reduced diameter. In other words, the sealing plug therefore has at least one point with a diameter which is smaller than the diameter of regions of the sealing plug adjoining this region on both sides in the direction of longitudinal extent of the sealing plug. In particular, the reduced diameter of the constriction can be smaller than the diameter, in particular the smallest diameter, of the second section of the wire guiding channel. This configuration of the sealing plug enables the molding compound to pass into the region of the constriction and, at least on one side of the constriction, to enclose a region there with a correspondingly larger diameter of the sealing plug. An undercut or anchor fixing can therefore be realized as a result, with the molding compound after hardening holding or fixing the sealing plug in a form-fitting manner in the second section of the wire guiding channel. The sealing plug can thereby be fixed in a particularly simple and reliable way, thus enabling the reliability of the electric machine to advantageously be improved further without additional components having to be installed.

In an advantageous development of the present invention, a widened portion of the sealing plug delimiting the constriction on a side facing the center longitudinal axis is interrupted here in regions in the circumferential direction thereof. In other words, this inner-side widened portion of the sealing plug is therefore formed up to the full diameter of the second section of the wire guiding channel only in regions and has sections or regions which have a diameter which is smaller than the diameter of the second section of the wire guiding channel. The diameter in these interruptions can correspond at least substantially to the diameter of the constriction or can lie between the diameter of the constriction and the diameter of the second section of the wire guiding channel. By way of the at least one interruption to the widened portion, a connection or access to the constriction can advantageously be created or formed. By way of this connection or by way of this access, during the manufacturing of the electric machine, the molding compound which encloses the contact wire and is then still liquid or viscous can pass from the inside, i.e. from the side facing the center longitudinal axis, radially outward as far as the constriction. As a result, a region of the second section of the wire guiding channel that is not taken up by the sealing plug can be filled particularly reliably by the molding compound, and thus, in turn, the sealing plug can be fixed particularly reliably, by the molding compound. In order for the region or volume of the second section of the wire guiding channel that is not taken up by the sealing plug to be filled as uniformly as possible by the molding compound and in order for the sealing plug to be fixed particularly reliably and uniformly by the molding compound, the widened portion of the sealing plug can have a plurality of interruptions, in particular distributed uniformly, preferably in the circumferential direction.

A further aspect of the present invention is a motor vehicle which has at least one electric machine according to an embodiment of the invention. If the electric machine is a drive motor for generating a force or a torque for propulsion of the motor vehicle, the motor vehicle can accordingly be an electric or hybrid vehicle.

Further features of the invention can emerge from the claims, the figures and the description of the figures. The features and combinations of features mentioned above in the description and the features and combinations of features mentioned in the description of the figures below and/or shown in the figures alone can be used not only in the respectively stated combination but also in other combinations or alone without departing from the scope of the invention.

BRIEF DESCRIPTION OF THE DRAWINGS

FIG. 3 shows a partial schematic sectional view of a region around the sealing plug in an unfilled state.

FIG. 4 shows a partial schematic sectional view of a region around the sealing plug in a filled state.

FIG. 5 shows a partial schematic sectional view of a region with an alternative sealing element.

DETAILED DESCRIPTION OF THE DRAWINGS

In the figures, identical and functionally identical elements are in each case provided with the same reference signs.

Figure 1:
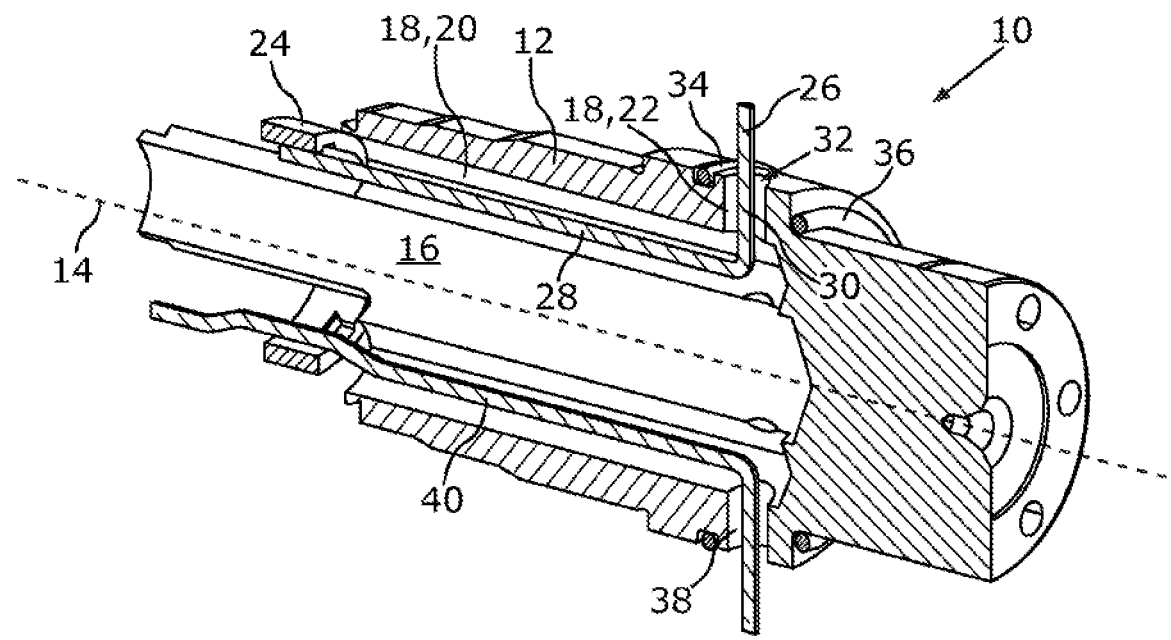
FIG. 1 shows a schematic sectioned perspective view of part of an electric machine.

FIG. 1 shows a schematic sectioned perspective view of part of an electric machine 10. In particular, part of a slip ring module 12 which can rotate about a center longitudinal axis 14 is illustrated here. The center longitudinal axis 14 runs here longitudinally centrally through a shaft receiving space 16 which is surrounded by the slip ring module 12 and in which a motor shaft of the electric machine 10 can be arranged. A wire guiding channel 18 runs in the slip ring module 12. This wire guiding channel 18 has a first section 20 running in the axial direction parallel to the center longitudinal axis 14 and a second section 22 which adjoins the first section and runs radially through a wall of the slip ring module 12. Furthermore, a slip ring 24 which likewise surrounds the shaft receiving space 16 is illustrated here. A contact wire 26 is arranged here in the wire guiding channel 18, the contact wire being electrically contacting the slip ring 24 and, at its other end, being guided out of the wire guiding channel 18 through the second section 22 of the latter. In the complete electric machine 10, that end of the contact wire 26 which is led out of the second section can be guided as far as the rotor winding, i.e. can be electrically connected to such a rotor winding.

Analogously to the wire guiding channel 18, the contact wire 26 has an axial piece 28 which runs in the first section 20 and therefore likewise offset radially outward parallel to the center longitudinal axis 14. Also analogously to the wire guiding channel 18, a radial piece 30 of the contact wire 26 adjoins this axial piece 28. This radial piece 30 is guided radially outward through the second section 22. An end of the second section 22 lying radially on the outside is referred to here as a wire outlet 32 from which the radial piece 30 of the contact wire 26 therefore projects out of the slip ring module 12.

In order to better show a course of the contact wire 26, the wire guiding channel 18 is illustrated here in an empty, i.e. unfilled state. Within the scope of further manufacturing of the electric machine 10, the wire guiding channel 18 is also enclosed, i.e. a region surrounding the contact wire 26 is also filled in order to electrically insulate and spatially fix the contact wire 26.

In the axial direction, i.e. in the direction along the center longitudinal axis 14, sealing rings are arranged here on both sides of the wire outlet 32, namely a first seal 34 on a side facing the slip ring 24 and a second seal 36 on the opposite other side of the wire outlet 32.

In the present case, the electric machine 10 or the slip ring module 12 can have a plurality of wire guiding channels 18 having a respective dedicated contact wire 26 arranged therein. By way of example, a further wire guiding channel 38 with a further contact wire 40 is illustrated here. The statements and explanations provided here regarding the wire guiding channel 18 and the contact wire 26 or the further wire guiding channel 38 and the further contact wire 40 are to apply analogously to the wire guiding channels or contact wire and to further wire guiding channels or contact wires that are not illustrated here.

In spite of the seals 34, 36, it has been shown that, during the operation of the electric machine 10, oil can pass to the wire outlet 32 and along the contact wire 26 through the wire guiding channel 18 as far as the slip ring 24 or as far as a slip contact formed by the slip ring 24 and the contact wire 26. In order to avoid this, the wire guiding channel 18 or the second section 22 thereof is sealed here by an additional sealing element, which surrounds the contact wire 26 in the region of the second portion 22 or at the wire outlet 32, in order to prevent or to reduce oil penetrating the wire guiding channel 18.

Figure 2:
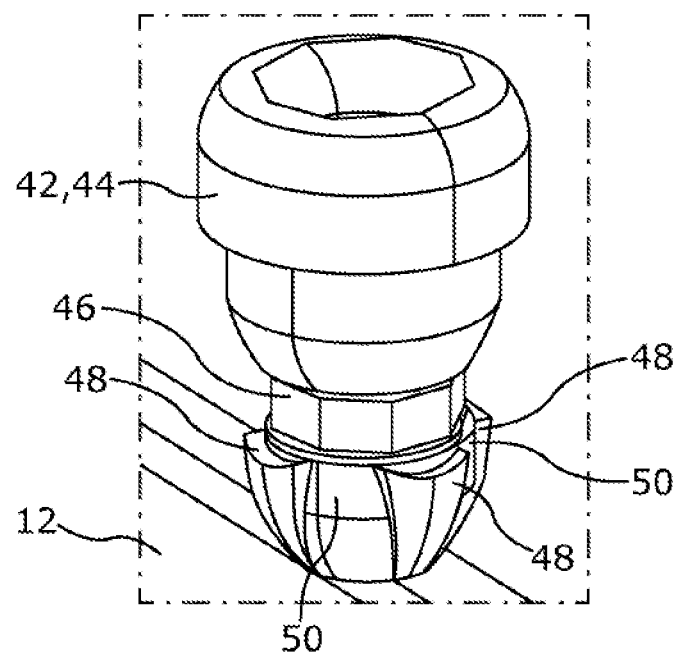
FIG. 2 shows a schematic perspective view of a sealing plug for a wire guiding channel of the electric machine.

Such a sealing element is illustrated in a schematic perspective view in FIG. 2 in the form of a sealing plug 42. The sealing plug 42 here has a substantially mushroom-shaped basic form with a widened head region 44 and an adjoining narrower shaft region. A constriction 46 is provided here on the shaft region. On a side of the constriction 46 opposite the head region 44, the sealing stopper 42 has a plurality of widened portions 48 distributed uniformly in the circumferential direction. These widened portions 48 are interrupted in the circumferential direction by interruptions 50 in each case lying in between. In the region of the interruptions 50, the sealing plug 42 therefore has a smaller diameter than in the region of the widened portions 48.

During the manufacturing of the electric machine 10, the sealing stopper 42 can be plugged or pushed from the outside inward for example in the radial direction onto the radial piece 30 and into the second section 22. A lower side of the head region 44 facing the constriction 46 can then rest on an outer side of the slip module 12 in the region of the wire outlet 32.

Here too, for the sake of clarity, the wire guiding channel 18 is still illustrated in an unfilled state, i.e. empty except for the contact wire 26 and the sealing plug 42, during the manufacturing of the electric machine 10.

FIG. 4 also shows the region around the second section 22 in a likewise partial schematic sectional view. However, the wire guiding channel 18 is illustrated here in a filled state. The wire guiding channel 18 is filled here by a thermoset molding compound 52. This molding compound 52 therefore encloses the contact wire 26 and at least partially the sealing plug 42. In particular, the molding compound 52 fills the second section 22 of the wire guiding channel 18 in the region of the constriction 46 of the inserted sealing plug 42 and therefore fixes not only the contact wire 26 but also the sealing plug 42. By contrast, the shaft receiving space 16 is not filled by the molding compound 52, i.e. remains free in order to receive the motor shaft, not illustrated here, of the electric machine 10. The shaft receiving space 16 can be separated, for example, from the region filled here by the molding compound 52. Similarly, during a manufacturing process, a place holder element corresponding in its shape to the shaft receiving space 16 can be inserted into the slip ring module 12, then encapsulated by injection molding or potted with the molding compound 52 and subsequently, after at least partial solidification or hardening of the molding compound 52, removed again in order to release the shaft receiving space 16.

FIG. 5 shows a partial schematic sectional view of a region around a radial section of the further wire guiding channel 38 with an alternatively configured sealing element. The sealing element for sealing the further wire guiding channel 38 is designed here as an O ring 54 surrounding the further contact wire 40. Depending on the application or requirements, in a specific electric machine 10, all of the sealing elements can preferably be formed identically, i.e. either as a sealing plug 42 or as an O ring 54.

Overall, the described examples show how wire outlets of wires for electrical contacting of rotor windings or slip contacts on the slip ring module 12 can be sealed by a sealing element, in particular an elastomer sealing plug with a fastening anchor, in order to improve oil tightness and therefore reliability in particular in a wet-running, i.e. oiled, operation of the electric machine 10.

| List of reference signs | |
|---|---|
| 10 | Electric machine |
| 12 | Slip ring module |
| 14 | Center longitudinal axis |
| 16 | Shaft receiving space |
| 18 | Wire guiding channel |
| 20 | First section |
| 22 | Second section |
| 24 | Slip ring |
| 26 | Contact wire |
| 28 | Axial piece |
| 30 | Radial piece |
| 32 | Wire outlet |
| 34 | First seal |
| 36 | Second seal |
| 38 | Further wire guiding channel |
| 40 | Further contact wire |
| 42 | Sealing plug |
| 44 | Head region |
| 46 | Constriction |
| 48 | Widened portions |
| 50 | Interruptions |
| 52 | Molding compound |
| 54 | O ring |

What is claimed is:

1. An electric machine comprising:
a stator;
a rotor which is mounted to be rotatably movable about a center longitudinal axis of a motor shaft of the electric machine; and
a slip ring module which is connected to the motor shaft, is fixed in terms of rotation with respect to the rotor, is rotatable relative to a slip ring of the electric machine, and has a wire guiding channel through which a contact wire for electrically connecting a rotor winding to the slip ring is guided from the latter as far as a wire outlet of the slip ring module,
wherein:
a first section of the wire guiding channel runs from the slip ring in an axial direction parallel to a center longitudinal axis and an adjoining second section of the wire guiding channel runs radially outward as far as the wire outlet,
an elastic sealing element surrounding the contact wire for sealing the wire guiding channel from penetration of a lubricant at the wire outlet is arranged in or on the second section,
the sealing element is configured as a sealing plug which is arranged in the second section of the wire guiding channel, and
the sealing plug is fixed in the second section by a molding compound which encases and fixes the contact wire at least in the first section.

2. The electric machine according to claim 1, wherein:
the wire guiding channel is mostly filled with a thermoset molding compound surrounding the contact wire.

3. The electric machine according to claim 1, wherein:
the sealing element is manufactured from an elastomer having a dielectric strength of at least 15 kV/mm.

4. The electric machine according to claim 1, wherein:
the elastomer is an ethylene acrylate elastomer.

5. The electric machine according to claim 1, wherein:
the sealing plug projects radially outward beyond an end, formed by the wire outlet, of the second section of the wire guiding channel.

6. The electric machine according to claim 1, wherein:
the sealing plug has an at least substantially mushroom-shaped form with a shaft region and a head region which is widened in comparison to the shaft region, and
a largest diameter of the head region is larger than a smallest diameter of the second section of the wire guiding channel.

7. The electric machine according to claim 1, wherein:
the sealing plug has a constriction with a reduced diameter.

8. The electric machine according to claim 7, wherein:
a widened portion of the sealing plug delimiting the constriction on a side facing the center longitudinal axis is interrupted in regions in a circumferential direction of the sealing plug.

9. A motor vehicle comprising the electric machine according to claim 1.

* * * * *